ns Patent [19] [11] 3,832,893
Dlugos et al. [45] Sept. 3, 1974

[54] DEVICE FOR INDICATING OR CONTROLLING LOAD CHANGES IN STEAM OR GAS TURBINES

[75] Inventors: Hans Georg Dlugos; Friedrich Zerrmayr, both of Erlangen, Germany

[73] Assignee: Kraftwerke Union Aktiengesellschaft, Mulheim, Germany

[22] Filed: Oct. 16, 1972

[21] Appl. No.: 298,032

[30] Foreign Application Priority Data
Oct. 16, 1971 Germany............................ 2151661

[52] U.S. Cl. ............................. 73/116, 60/39.28 T
[51] Int. Cl............................. G01l 5/12, F02c 1/00
[58] Field of Search ............ 73/113, 15.6, 346, 116; 60/39.28, 39.28 T

[56] References Cited
UNITED STATES PATENTS

| | | | |
|---|---|---|---|
| 1,680,589 | 8/1928 | Bock | 73/15.6 |
| 2,755,999 | 7/1956 | Vickers | 73/116 |
| 3,357,239 | 12/1967 | Hohenberg | 73/116 |
| 3,538,707 | 11/1970 | Karol | 60/39.28 |

Primary Examiner—Richard C. Queisser
Assistant Examiner—Stephen A. Kreitman
Attorney, Agent, or Firm—Herbert L. Lerner

[57] ABSTRACT

A device for indicating or controlling the respective permissible limits of intended load changes of a gas or steam turbine is operable to limit the speed of load changes for the steam or gas turbines. In operation a time-temperature curve representing the average integral temperature in the turbine shaft relative to time is derived from a continually measured temperature, such measured temperature corresponding to the variable surface temperature of the turbine shaft.

5 Claims, 4 Drawing Figures

DEVICE FOR INDICATING OR CONTROLLING LOAD CHANGES IN STEAM OR GAS TURBINES

The present invention relates to a device for indicating or controlling the respective permissible limits of intended load changes of a steam or gas turbine which is operated with a constant or alternating load. More particularly, the invention relates to a device in which the thermal condition of a turbine shaft are taken into account, and wherein a computer is continuously fed with measured values which are indicative of the thermal stress conditions of the turbine shaft.

Devices for indicating the respective desired limits of possible load changes of a steam or gas turbine are known where, in addition to measuring the electric power delivered by the generator which is driven by the turbine, the temperature of the steam at the inlet is measured. In addition the pressure and the temperature of the steam taken at an extraction point, or the pressure and temperature of the exhaust, may be measured and these values are compared in a measuring device with an artificially produced decay function, selected on the basis of experience and on known operating conditions. The pulses derived from this comparison are utilized to indicate the desirable load limits. An example of a known device of this type is disclosed in German published prosecuted application DAS No. 1,401,453.

In the present invention, also taken into account are the thermal conditions of the turbine shaft since, due to geometrical factors and material properties or characteristics, the shaft is subjected to extraordinary thermal stress during changes in power temperature.

To be able to control the thermal stresses by a control computer, it is necessary to know the time-temperature curve within a turbine shaft. The existing possibility of directly measuring the temperature at or in the interior of rapidly rotating components, such as a turbine shaft, however, do not meet the demands which must be fulfilled with respect to operational reliability and measuring accuracy.

Heretofore, attempts have been made to derive or reduce the thermal state of a turbine shaft indirectly with other measured values. For example, a known arrangement for reproducing such a state or condition employs an additional device comprised of a ring-shaped disc which is arranged at the steam inlet between the turbine inlet valve and the inlet, whereby the inside diameter of the steam line corresponds to the shaft circumference and the outside diameter of the disc corresponds to the shaft center. An example of such a known device is disclosed in German published non-prosecuted application DOS No. 1,917,564.

It was found, however, that such an arrangement does not always deliver sufficiently accurate measured values, aside from the fact that the apparatus needed to reproduce the thermal conditions of the shaft are very costly.

The aforementioned disadvantages of known prior art arrangements are overcome by the present invention.

The present invention includes the feature that the time-temperature curve of the average integral temperature in the turbine shaft is derived or reproduced from measured temperature values which are measured continually or constantly at short intervals and which are derived either from the variable surface temperature of the shaft or which correspond to the variable surface temperature of the shaft.

A computer, preferably an electronic analog computer, is able to determine by computation the determinative or decisive temperature conditions for limiting load charges as integrally determined across the observed cross-section of the shaft. The computer is able to perform this function based on a temperature measured for example at the inside of the housing through which the shaft passes with the housing temperature at the point of measurement corresponding to the shaft surface temperature. To this end, the difference of the measured surface temperature of the shaft or of the appropriate substitute temperature, for example, the housing temperature, on one hand, and of the computed average integral temperature, on the other hand, are utilized as a measure or indication of the thermal stress conditions of the shaft. As for the temperature being measured, the point of measurement is taken at some point on a housing on the steam side or on the gas side whose temperature conditions coincide to a great extent with that on the turbine shaft surface. In contrast to known expensive apparatus which comprise temperature probes and temperature simulators which are used to indicate the thermal state of the shaft, the housing measuring point mentioned above is relatively simple to produce and requires no additional structural measures.

Since the integral average temperature of the shaft reacts faster to temperature changes in the ambient or surrounding medium than does an average temperature continuously measured at a substitute locality which corresponds to the integrally measured temperature of the shaft only at specific temperature conditions and distributions, the invention makes it possible to measure smaller temperature differences and thereby makes it possible to approach actual conditions to a greater extent. In the final result, this allows a better utilization of the permissible temperature differences which frequently makes it possible to effect rapid temperature and power changes. The present invention further encompasses the use of electronic computer components, which makes it possible to provide for simplified modification and adjustment of the device with respect to the conditions which are determined at the turbine installation under actual operating conditions.

Other features which are considered as characteristic for the invention are set forth in the appended claims.

Although the invention is illustrated and described by means of a specific example and in a specific embodiment, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
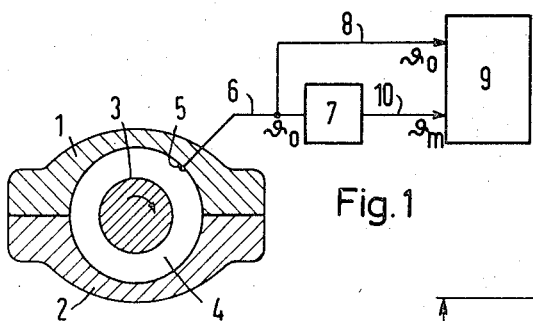
FIG. 1 shows a cross-sectional view of a gas or steam turbine housing and shaft and also the components used for controlling load changes occuring to one embodiment of the invention.

Referring to the drawing, FIG. 1 shows the interior of a housing of a gas or steam turbine consisting of an upper part 1 and a lower part 2. Also shown is a shaft 3 whose thermal stress conditions are to be determined as regards its temperature conditions with respect to time. The temperature which is determinative or decisive for controlling load changes is measured integrally across the observed shaft cross-section and is derived from a temperature which is measured in the interior space 4 of the housing and whose temperature conditions correspond to the shaft surface temperature which itself is not measured directly. The temperature is measured with at least one temperature sensor 5 which extends from the inside wall of at least one of the housing parts 1 or 2 into the space 4. The sensor 5 is positioned directly in the vicinity of the inside wall or is arranged in such a way that the temperature which prevails at the point of measurement corresponds to and is generally or substantially equal to the shaft surface temperature. The temperature signal $\theta_o$ obtained by the sensor 5 is supplied along path 6 to a computer 7 and, in addition, along a path 8 directly to one input of a control device, such as, for example, to a wall temperature device 9. The computer 7 delivers along path 10 a derived or simulated signal $\theta_m$ to another input of the control device 9, whereby the difference between the measured substitute surface temperature $\theta_o$ of the shaft and the calculated, average integral temperature $\theta_m$ can be utilized as an idication or measure of the thermal stress condition of the shaft 3.

Figure 2:
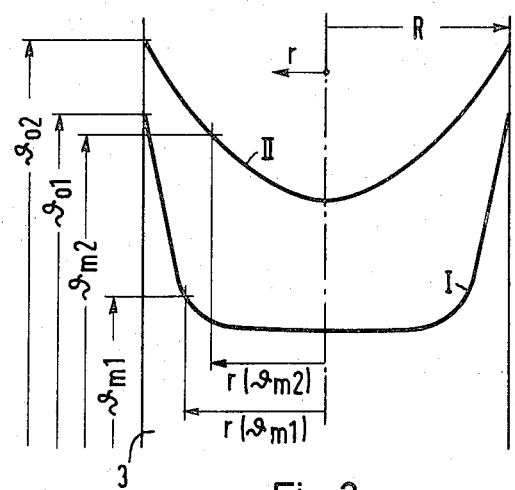
FIG. 2 shows curves representing the temperature variation within a shaft having a radius R.

FIG. 2 illustrates the derivation of the average shaft temperature $\theta_m$ and the temperature distribution within the shaft 3 which has a radius R. With respect to any turbine shaft, the temperature with the greatest deviation from the average temperature of the shaft when the latter is rotating, is on the shaft surface, bearing in mind that the shaft surface reacts most rapidly and most strongly to temperature changes. The average temperature $\theta_m$ would have to be measured in the interior of the shaft, however, the position of the measured value depends on various factors such as the characteristics of the temperature conditions. In the case of a balanced temperature condition immediately following a rise of the shaft surface temperature $\theta_o$, the average temperature continues to be located very close to the shaft surface (curve I, FIG. 2). However, with an increase temperature balance, the local radius at the location of the average temperature is shortened. The location of the average temperature travels or migrates toward the shaft axis. In a parabolic temperature curve which occurs in quasi-stationary temperature changes, the location of the average shaft temperature is at 0.71 R (curve II, FIG. 2).

Assuming that the heat conduction occurs in a radial direction, that is assuming that the heat transfer in an axial directions is neglected, a solution or derivation can be obtained for the time curve of $\theta_m$, namely for a sudden change of the surface temperature $\theta_o$. This derivation respresents a transition function for $\theta_m$ and characerizes the temperature variations relative to time. If this function is reproduced in an electronic circuit, it is possible to obtain at the output of the circuit, the time-delayed signal $\theta_m$ if a signal $\theta_o$, is fed into the change of $\theta_o$ can thereby be effected according to an arbitrary time curve.

Figure 3:
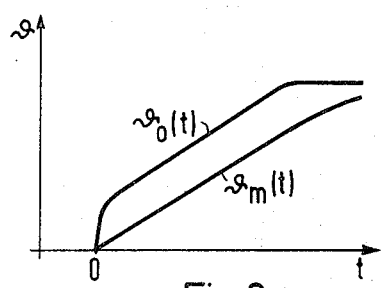
FIG. 3 shows time-temperature representing the average integral temperature and the surface temperature.

FIG. 3 shows the reproduced or derived time characteristics of $\theta_m$ in terms of its dependence on the measured temperature value $\theta_o$. At time point zero of the computation, a balanced temperature must prevail in the shaft. This requirement is met since the differences in temperature along the radius of the shaft are very slight when the shaft is stationary.

In contrast to the stationary measurement which would produce great differences between $\theta_o$ and $\theta_m$, in the first moments following a temperature change, the temperature differences correspond to the true thermal stress. In order to obtain a temperature signal which corresponds to the curve of the surface temperature of the shaft, it is not so important to indicate exactly the absolute value of the temperature but rather, the curve or variable characteristics since essentially only the difference between $\theta_m$ and $\theta_o$ is significant.

If as a substitute measuring location for $\theta_o$, the interior surface of the housing opposite the shaft section to be monitored was selected, this measurement is a good substitute for the shaft surface temperature, particularly in saturated steam turbines with a predominantly condensation-heat transfer.

The differential Equation of the thermal conduction in a cylindrical cross section, whose r is the radius and $\theta$ is the temperature would be as follows:

$\delta\theta/\delta t = a \,[(\delta^2\theta/\delta r^2) + (1/r)\,(\delta\theta/\delta r)]$ where $a$ represents the temperature conductivity which is a material quantity. As a marginal requirement, the surface temperature which is considered known, is inserted.

The average temperature of a cylinder with one-dimensional temperature distribution is computed according to the Equation:

$$\theta_m = \frac{2}{R^2} \int_{r=0}^{R} \theta\,(r) \cdot r\, dr,$$

where $R$ represents the outer radius of the shaft.

The solution is:

$$\theta_m = \theta_o \left(1 - \sum_{k=1}^{k'=\infty} \frac{4}{\mu_k^2} e^{-\mu_k^2 t/\tau}\right)$$

whereby $\mu_K$ for $K=1$ to $K=\infty$ includes table values and the quantity $\tau = R^2/a$ has the form of a time constant which takes into consideration the dimension and the material characteristics of the shaft. The mathematical Equation t be derived for changing values of $\theta_m$ following a rise of the surface temperature from 0 to $\theta_o$ thus has the form:

$\theta m = \theta_o\,[1 - (K_1 e^{-t/T_1} + K_2 e^{-t/T_2} + K_3 e^{-t/T_3} + K_4 e^{-t/T_4} + \ldots)]$ whereby the constant $K_k$ $(4/\mu_K^2)$ as well as the time constants $T_K$ decrease rapidly with an increase in indices $k$.

The individual e-functions of the Equation can be reproduced with good accuracy in long term constancy with known components.

The extent to which the expense for the electric circuit should be stretched in order to obtain a good reproduction of the thermal conditions, depends in a practical sense on the magnitude of the time constants $T_1, T_2, T_3 \ldots$ etc.

In practical application, it is sufficient to interrupt the series of $e$-functions, after the second component, and to replace the remaining components with a correction component which is still to be determined. The correction component is used to eliminate the error caused by the interruption of the $e$-functions, which is particularly notable during the time $t = o$.

The first two components of the $e$-series as well as the correction component which is effective a relatively short time, are reproduced with three long-term integrators and individually evaluated with the summation amplifier and combined to provide a total functional condition.

Figure 4:
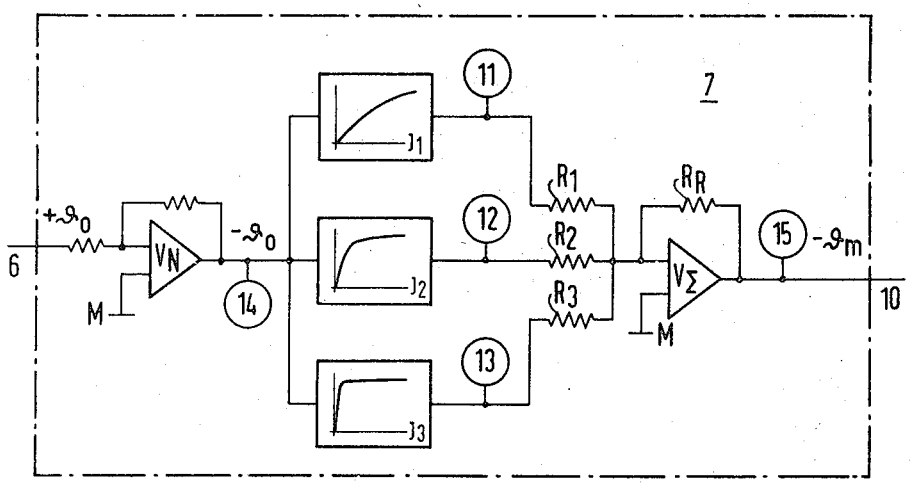
FIG. 4 is a circuit diagram of a circuit used for determining the average integral temperature of the shaft.

The circuit of the computer indicated at 7 in FIG. 1 is shown in FIG. 4. An input to the computer 7 arrives along path 6 and represents the measured surface temperature $+\theta_o$. An amplifier $V_N$ converts the temperature signal into a standard electrical value at the output of the amplifier $V_N$, so that at point 14, a standard input voltage occurs which corresponds to the temperature value $-\theta_o$.

Three long-term integrators are indicated at $J_1$, $J_2$ and $J_3$. At points 11, 12 and 13, the following respective partial functions occur:

$(1 - e^{-t/T_1}, 1 - e^{-t/T_2}, 1 - e^{-t/T_k})$.

At the output of a summing amplifier $V_\Sigma$ there occurs at point 15, the derived or reproduced value of the average temperature $-\theta_m$.

As regards amplification the following applies:
$K_1 = R_R/R_1$, $K_2 = R_R/R_2$ and $K_K = R_R/R_K$ The general form of the function $\theta_m (\theta_o, t)$ with two components and correction component would be as follows:
$\theta_m = \theta_o [1 - (K_1 e^{-t/T_1} + K_2 e^{-t/T_2} + K_K e^{-t/T_K})]$
with the requirement
$K_1 + K_2 + K_K = 1$
the following is obtained:
$\theta_m = \theta_o [K_1 (1 - e^{-t/T_1}) + K_2 (1 - e^{-t/T_2}) + K_K (1 - e^{-t/T_K})]$ The value of the square bracket is determined gradually.

Integrators $J_1$ and $J_2$ define the functions $(1 - e^{-t/T_1})$ and $(1 - e^{-t/T_2})$ with the time constants $T_1$ and $T_2$.

Integrator $J_3$ calculates the corrector function $(1 - e^{-t/T_k})$ with the time constants $T_K$ determined from the predetermined function curve. In summation amplifier $V_\Sigma$, the three functions are evaluated according to factors $K_1$, $K_2$ and $K_K$ and added to provide a total functional condition.

We claim:

1. A device for indicating or controlling permissible limits of load changes of a gas or steam turbine, said turbine having a shaft operating with a constant or alternating load, comprising means for measuring a temperature which corresponds to the internal temperature of said shaft, and computer means receiving said measured temperature and producing an output corresponding to the time-temperature curve of the average integral temperature of said shaft, wherein said computer means is an electronic analog computer, said computer being operable to compute the temperature integrally determined across the cross section of said shaft.

2. A device for indicating or controlling permissible limits of load changes of a gas or steam turbine, said turbine having a shaft operating with a constant or alternating load, comprising means for measuring a temperature which corresponds to the internal temperature of said shaft, and computer means receiving said measured temperature and producing an output corresponding to the time-temperature curve of the average integral temperature of said shaft, wherein said temperature measuring means measures the temperature in the interior of the housing through which said shaft passes, said measured temperature corresponding to the temperature of the shaft, and wherein the difference between said measured temperature and said computed temperature is determinative of the thermal stress conditions of said shaft.

3. A method for indicating or controlling permissible load changes of a gas or steam turbine, said turbine having a shaft operating with a constant or alternating load, comprising the steps of measuring a temperature which corresponds to the internal temperature of said shaft, utilizing said temperature as an input to a computing device, and producing an output from said computer device corresponding to the time-temperature curve of the average integral temperature of said shaft, and determining the difference between said measured temperature and said computed temperature, and utilizing said difference to determine the thermal stress conditions of said shaft.

4. A method according to claim 3, comprising continuously measuring said temperature which corresponds to the temperature of said shaft.

5. A method according to claim 3, comprising intermittently measuring said temperature which corresponds to the temperature of said shaft.

* * * * *